US010865057B2

(12) United States Patent
Viinonen

(10) Patent No.: US 10,865,057 B2
(45) Date of Patent: Dec. 15, 2020

(54) TRANSFER EQUIPMENT AND LOAD TRANSFER APPLIANCE

(71) Applicant: ACTIW OY, Naarajarvi (FI)

(72) Inventor: Reijo Viinonen, Pieksamaki (FI)

(73) Assignee: Actiw Oy, Naarajarvi (FI)

( * ) Notice: Subject to any disclaimer, the term of this patent is extended or adjusted under 35 U.S.C. 154(b) by 173 days.

(21) Appl. No.: 16/065,826

(22) PCT Filed: Feb. 16, 2017

(86) PCT No.: PCT/FI2017/050098
§ 371 (c)(1),
(2) Date: Jun. 25, 2018

(87) PCT Pub. No.: WO2017/140953
PCT Pub. Date: Aug. 24, 2017

(65) Prior Publication Data
US 2019/0009998 A1    Jan. 10, 2019

(30) Foreign Application Priority Data
Feb. 16, 2016 (FI) ..................... 20165111

(51) Int. Cl.
*B65G 67/20* (2006.01)
*B65G 67/24* (2006.01)

(52) U.S. Cl.
CPC ............ *B65G 67/20* (2013.01); *B65G 67/24* (2013.01)

(58) Field of Classification Search
CPC . B65G 7/02; B65G 7/04; B65G 67/20; B65G 67/24; B65G 69/22; B66F 9/12; B66F 9/195

USPC ......................................... 414/529
See application file for complete search history.

(56) References Cited

U.S. PATENT DOCUMENTS

| 3,186,568 | A | 6/1965 | Spinanger et al. |
| 4,457,424 | A | 7/1984 | Wuensch |
| 5,197,396 | A | 3/1993 | Breezer et al. |
| 10,099,872 | B2 * | 10/2018 | Auvinen ............... B65G 69/22 |
| 10,428,577 | B2 * | 10/2019 | Viinonen ............... B65G 67/20 |
| 2003/0080544 | A1 | 5/2003 | Rosenkranz |
| 2004/0217250 | A1 | 11/2004 | Kido et al. |
| 2011/0274532 | A1 | 11/2011 | Poutanen et al. |

(Continued)

FOREIGN PATENT DOCUMENTS

| CN | 201354176 | 12/2009 |
| CN | 102300792 | 12/2011 |

(Continued)

OTHER PUBLICATIONS

Unofficial English translation of Search Report in corresponding Chinese Application No. 201780009147.9.

(Continued)

*Primary Examiner* — Saul Rodriguez
*Assistant Examiner* — Brendan P Tighe
(74) *Attorney, Agent, or Firm* — Fildes & Outland, P.C.

(57) ABSTRACT

Transfer equipment, which is intended to be used in a load transfer appliance, includes a plastic sheet to be placed under the load and a stiffener plate which is attached as a stiffener to the plastic sheet. The transfer equipment also includes a second plastic sheet. In addition, in the transfer equipment, the stiffener plate is arranged between the plastic sheets. Also disclosed is a load transfer appliance.

16 Claims, 4 Drawing Sheets

(56) References Cited

U.S. PATENT DOCUMENTS

2016/0194165 A1* 7/2016 Auvinen ................ B65G 69/22
                                                            414/749.1
2017/0016273 A1* 1/2017 Viinonen .................. E06B 9/00

FOREIGN PATENT DOCUMENTS

| CN | 104354961 | 2/2015 |
| DE | 20 27 331 | 6/1971 |
| EP | 2706016 | 3/2014 |
| WO | 2005/070773 | 8/2005 |
| WO | 2005/080132 | 9/2005 |
| WO | 2010/086497 | 8/2010 |
| WO | 2015/040275 | 3/2015 |

OTHER PUBLICATIONS

First Chinese Office Action and English translation in corresponding Chinese Application No. 201780009147.9.
English language machine translation of CN 104354961.
English language abstract of WO 2005/070773.
English language abstract of CN 201354176.
International Search Report, International Application No. PCT/FI2017/050098, dated Jun. 7, 2017.
Supplementary European Search Report dated Oct. 10, 2019 in corresponding European Application No. 17752733.0.
English language machine translation of DE 20 27 331.
Actiw-TV: *LoadPlate in steel loading,* YouTube, Mar. 24, 2014, p. 1.

* cited by examiner

Fig. 1a
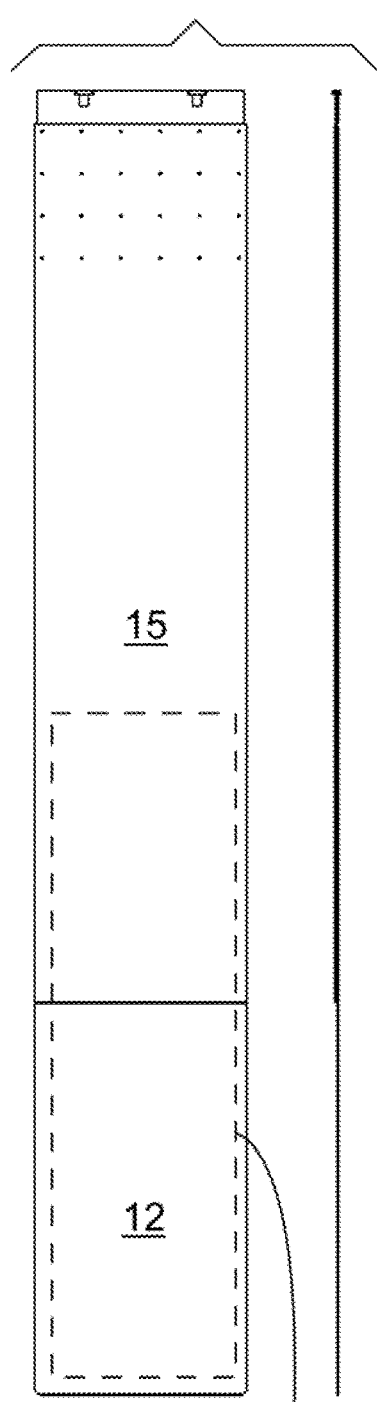
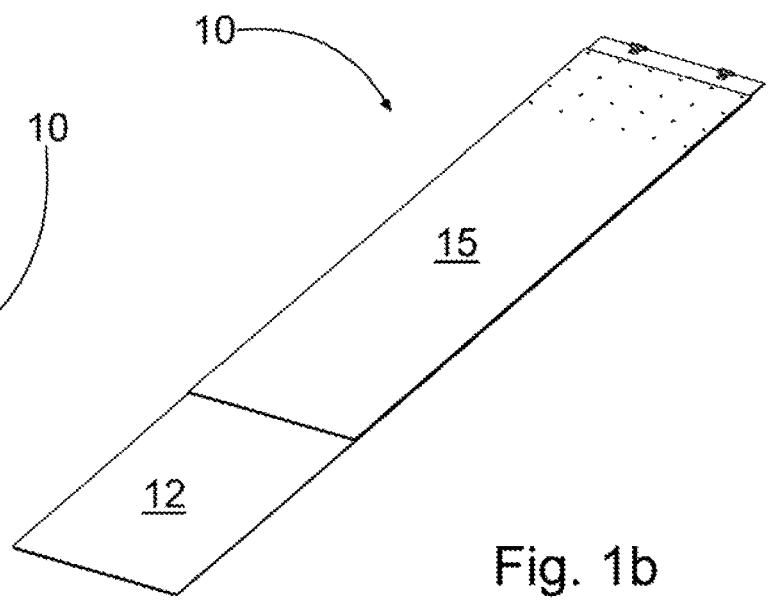
Fig. 1b
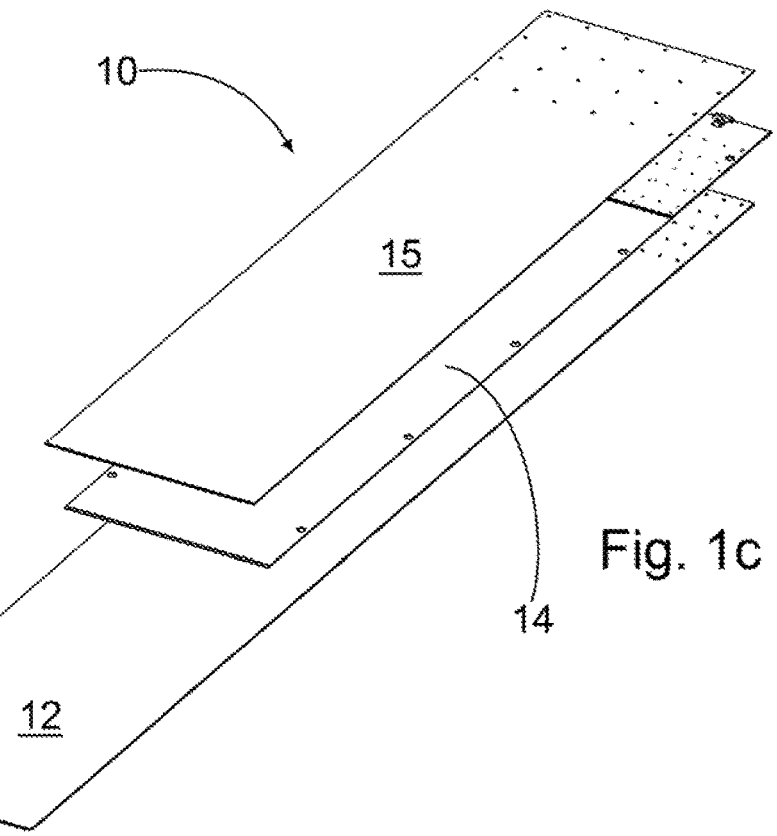
Fig. 1c

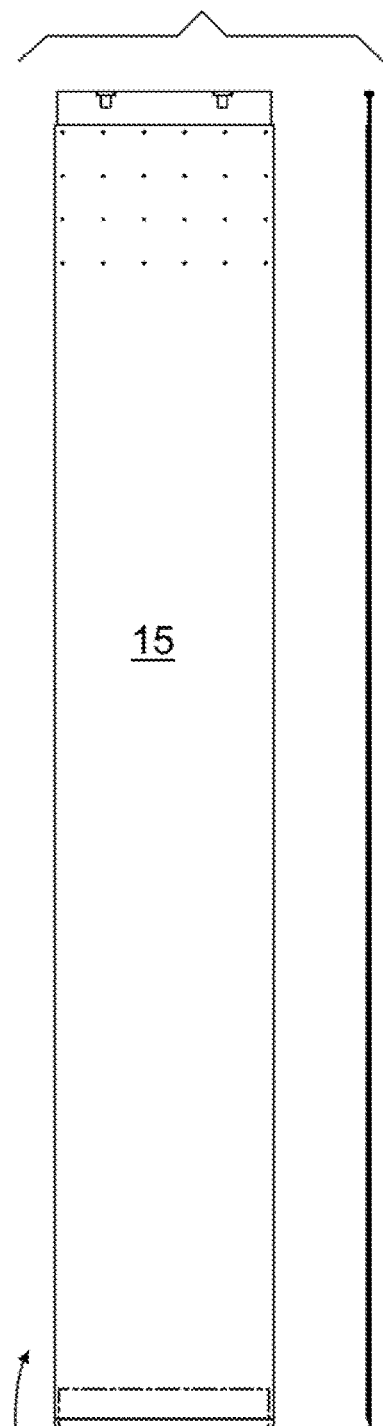
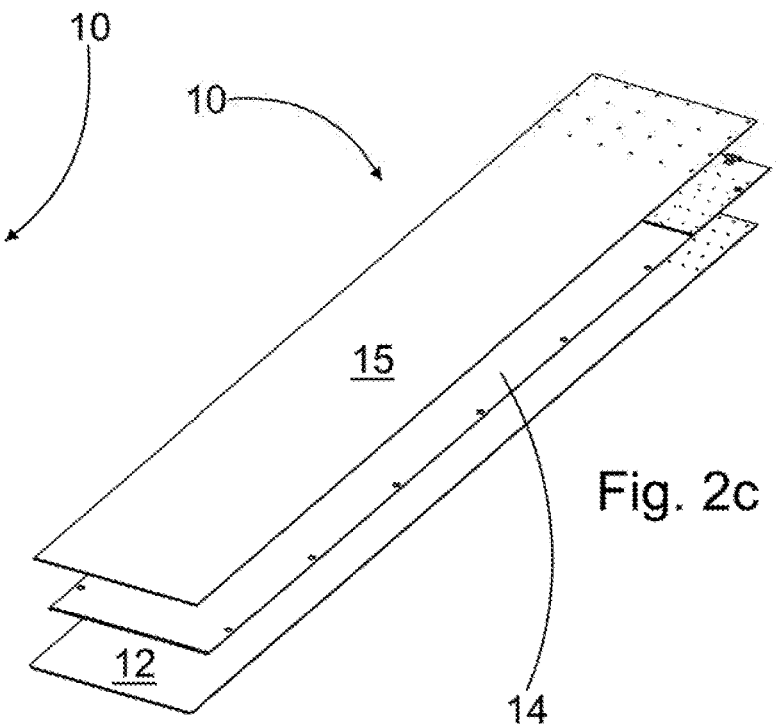
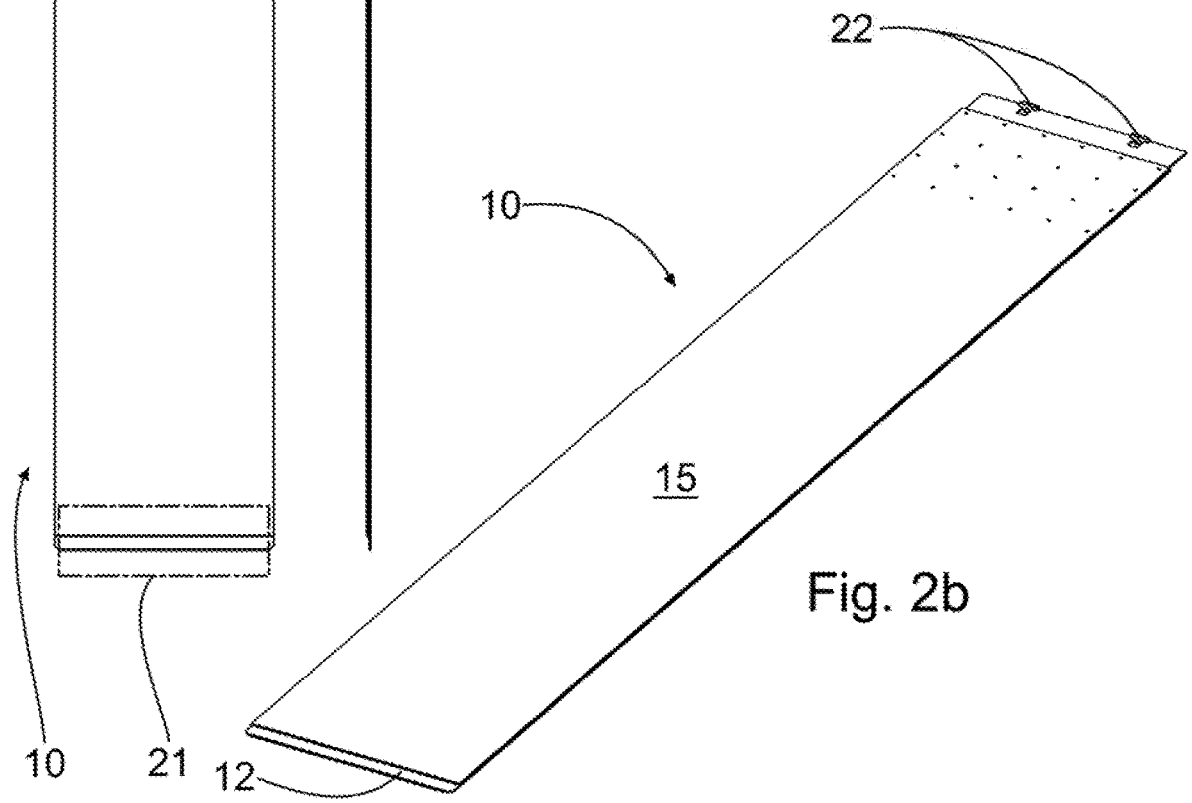

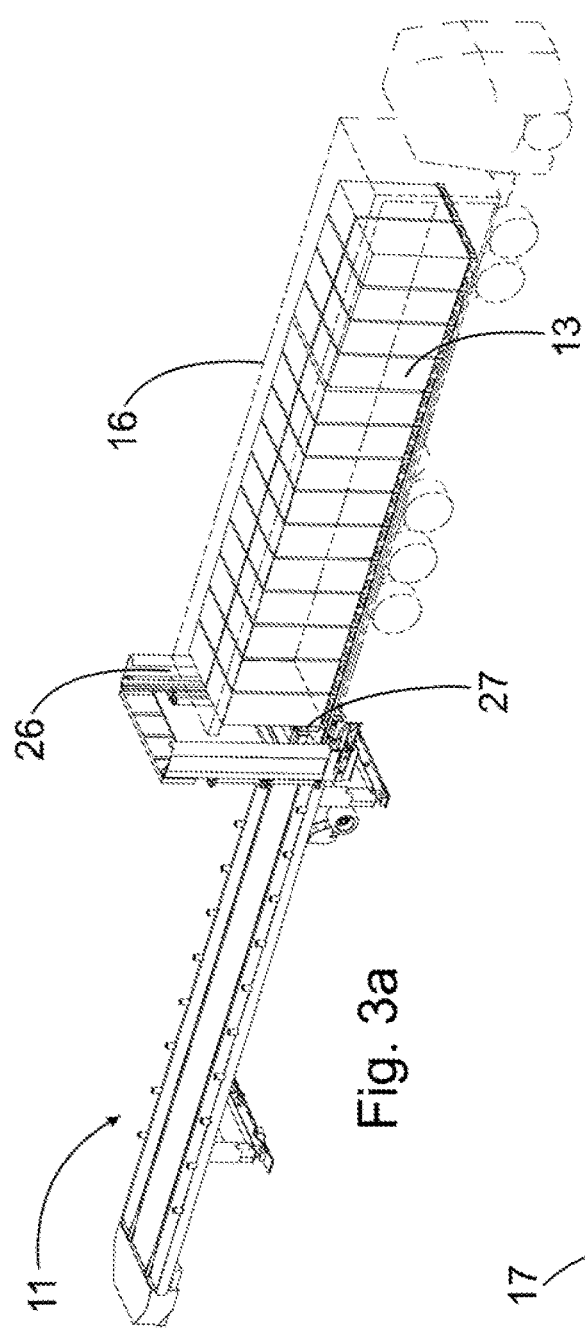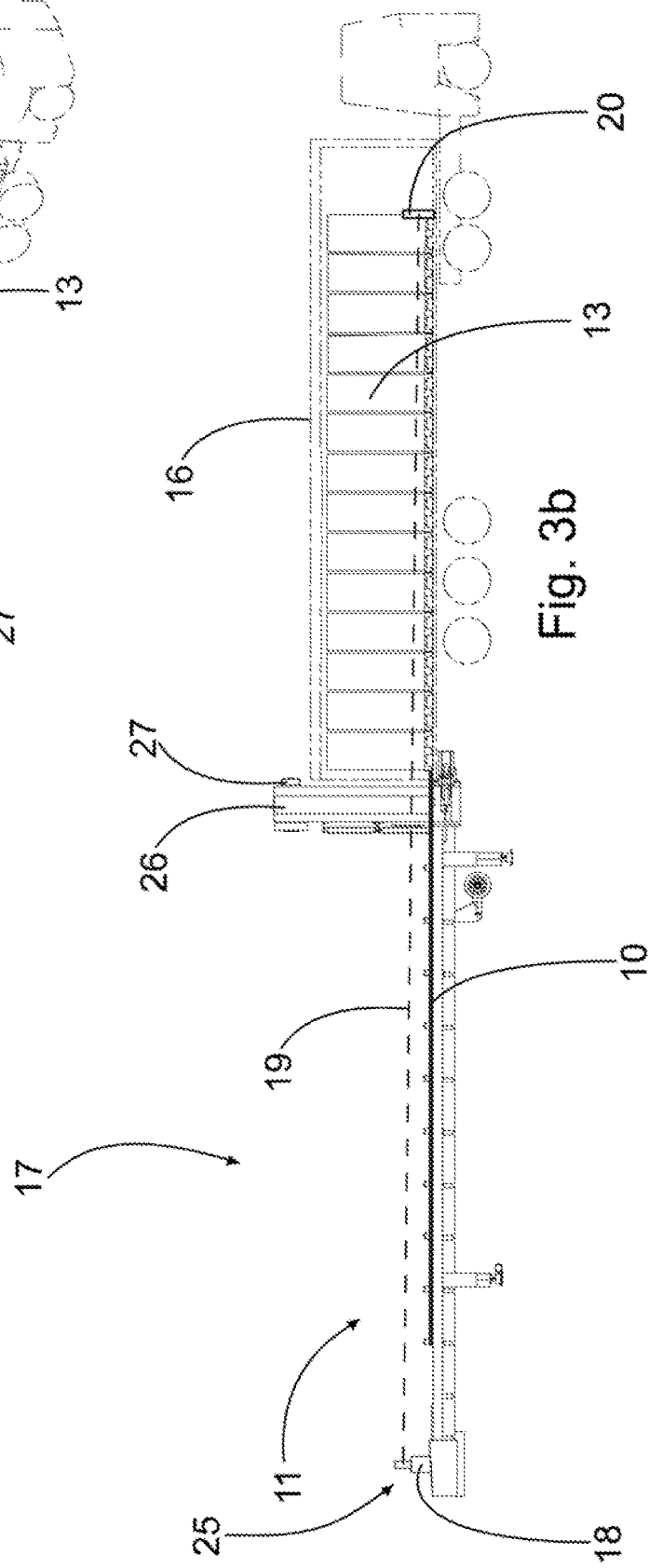

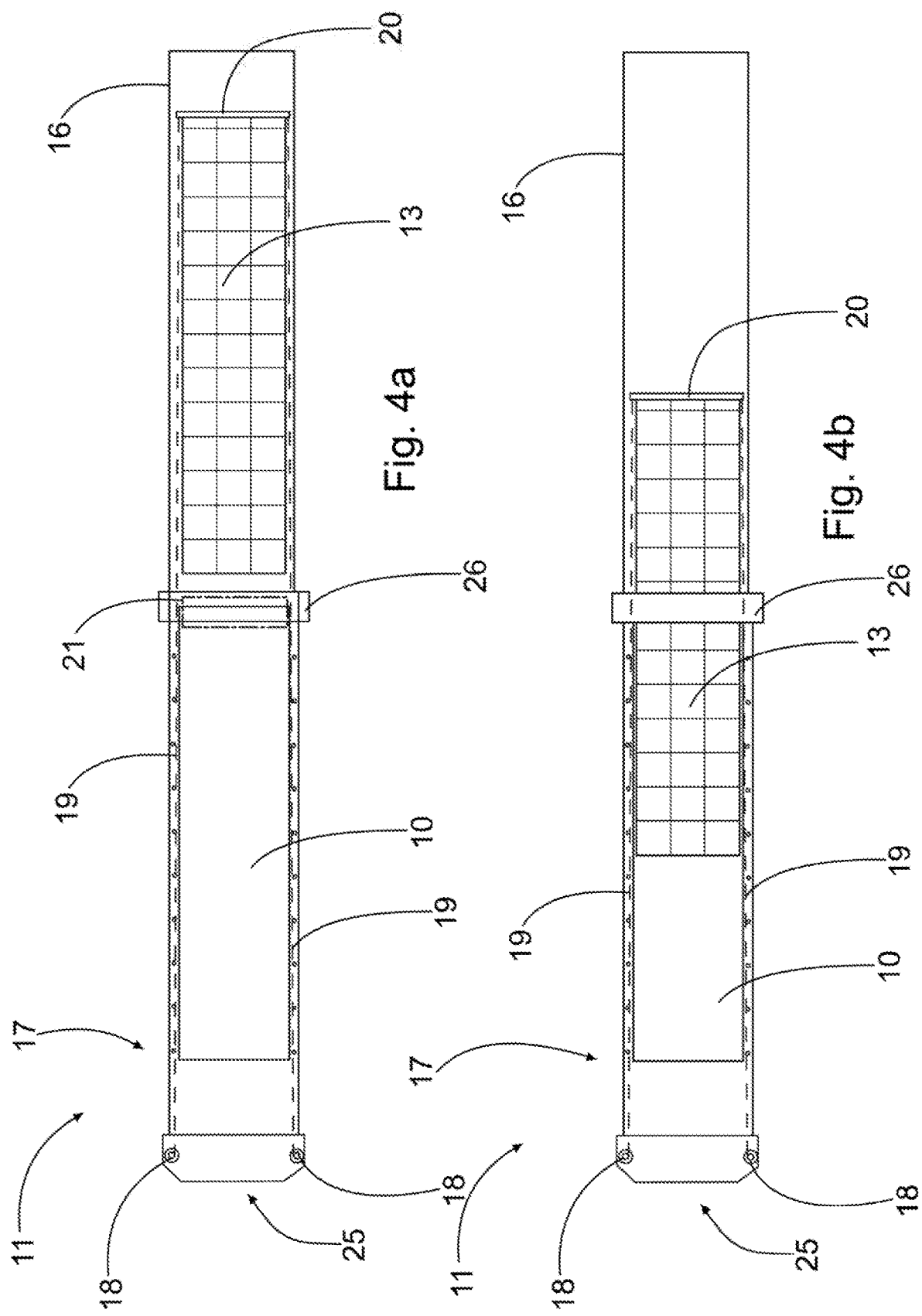

US 10,865,057 B2

TRANSFER EQUIPMENT AND LOAD TRANSFER APPLIANCE

CROSS-REFERENCE TO RELATED APPLICATION

This application claims benefit of priority from International Patent Application No. PCT/FI2017/050098 filed Feb. 16, 2017, which claims benefit of priority from Finland Patent Application No. 20165111 filed Feb. 16, 2016, both of which are incorporated by reference in their entirety.

FIELD OF THE INVENTION

The invention relates to transfer equipment, which is intended to be used in a load transfer appliance, and which includes a plastic sheet to be placed under the load, and, in addition to the plastic sheet, the transfer equipment includes a stiffener plate, which is attached as a stiffener to the plastic sheet. The invention also relates to a load transfer appliance.

BACKGROUND OF THE INVENTION

WO application publication number 2010/086497 discloses a method and load transfer appliance for loading products to be transported into a load space. In the load transfer appliance, transfer equipment is utilized, which is a plastic sheet. First, the load is formed on top of the transfer equipment. Next, the load together with the transfer equipment is pushed into the load space, after which the transfer equipment is pulled out from under the load. The load is supported during the pulling. In the method, the products are first loaded outside the load space onto the transfer equipment, which is to be pushed into the load space. After this, the load is moved into the load space by pushing the transfer equipment in along the bottom of the load space. Finally, the load is supported on the open side of the load space and the transfer equipment is pulled out from between the bottom of the load space and the load. In the load transfer appliance there is a frame and transfer equipment that can be moved on it. The load transfer appliance also includes a transfer device for moving the transfer equipment and the load into the load space and for pulling the transfer equipment out from between the bottom of the load space and the load.

EP application publication number 2706016 A1 discloses a pallet for transporting goods. In the pallet is a basic frame, on top of which a carrier plate is arranged. Correspondingly U.S. Pat. No. 5,197,396 discloses a plastic pallet, in which there is hollow-structure reinforcement between two plastic sheets.

SUMMARY OF THE INVENTION

The present invention is intended to create a new type of transfer equipment, which is durable and is suitable for use with various kinds of loads and load spaces. In addition, the invention is intended to create a new type of load transfer appliance, by means of which, in addition to making loads, a load can be unloaded from a load space. The characteristic features of the transfer equipment are a plastic sheet to be placed under the load and a stiffener plate which is attached as a stiffener to the plastic sheet. The transfer equipment also includes a second plastic sheet. In addition, in the transfer equipment, the stiffener plate is arranged between the plastic sheets. Correspondingly, the characteristic features of the load transfer appliance according to the invention are the transfer equipment and means for pulling the load from the load space onto the transfer equipment.

BRIEF DESCRIPTION OF THE DRAWINGS

In the following, the invention is described in detail with reference to the accompanying drawing showing some embodiments of the invention, in which FIG. 1a shows a top and side view of a first embodiment of the transfer equipment according to the invention, FIG. 1b shows the transfer equipment of FIG. 1a, seen at an angle from in front and from above, FIG. 1c shows an exploded view of the transfer equipment of FIG. 1a, seen as in FIG. 1b, FIG. 2a shows a top and side view of a first embodiment of the transfer equipment according to the invention, FIG. 2b shows the transfer equipment of FIG. 1a, seen at an angle from in front and from above, FIG. 2c shows an exploded view in the manner of FIG. 1b of the transfer equipment of FIG. 1a, FIG. 3a shows the load transfer appliance according to the invention, seen at an angle from in front, FIG. 3b shows a side view of the load transfer appliance of FIG. 3a when unloading a load, FIG. 4a shows a top view of the load transfer appliance according to the invention when starting unloading, FIG. 4b shows the load transfer appliance of FIG. 4a during the unloading of a load.

DETAILED DESCRIPTION OF THE INVENTION

FIGS. 1a-1c show a first embodiment of the transfer equipment according to the invention. The transfer equipment 10 is intended to be used in a load transfer appliance 11. In addition, the transfer equipment 10 includes a plastic sheet 12 to be placed under the load 13. According to the invention, the transfer equipment 10 includes, in addition to the plastic sheet 12, a stiffener plate 14, which is attached to the plastic sheet as stiffening. The transfer equipment can then be used to load part loads, without the detrimental bending of the plastic sheet.

In the invention, the transfer equipment 10 includes a second plastic sheet 15. In addition, in the transfer equipment 10 a stiffener plate 14 is arranged between the plastic sheets 12 and 15. All three plates are attached to each other at one end. In other words, the stiffener plate 14 and the plastic sheets 12 and 15 are attached to each other in the area of one end. The sheets can then adapt to the shapes of the bottom of the load space and to changes in temperature. In the embodiment shown, the plastic sheets are attached to the stiffener plate using different bolts. The number of attachments can then be dimensioned according to the loading. In this case, for example, the second plastic sheet coming on top of the stiffener plate is attached with 24 bolts, while the plastic sheet is attached with 58 bolts. The transfer appliance is connected to the stiffener plate, which transmits power to the transfer equipment. In other words, the transfer equipment 10 is attached in the load transfer appliance 11 by means of the stiffener plate 14. Power is then sure to be transmitted. More specifically, the stiffener plate 14 includes one or more attachment lugs 22 for attaching the transfer equipment 10 to the load transfer appliance 11. In practice, the attachment lug is attached to the power transmission chain in the load transfer appliance, by which the transfer equipment is pushed into the load space and by which the transfer equipment is pulled out of the load space. In the embodiment shown, there are two attachment lugs, so that the transfer equipment is loaded evenly and sufficient power is transmitted to the transfer equipment.

In this case, the total length of the transfer equipment 10 is about 45 feet, but it can also be 53 feet. Thus, the length of the transfer equipment is 6000-16000 mm. The transfer equipment is slightly longer than the load space. Thanks to the stiffener plate, the transfer equipment can be used to load a shorter load space than this. The most usual intermodal containers are 20 and 40-foot containers. Irrespective of the length of the load space, the load is formed starting from the front edge of the transfer equipment. When pushing the load into the load space, the front edge is then pushed in as far as the front wall of the load space, or close to it. The transfer equipment will withstand pushing even when only partly full, as the stiffening plate acts as stiffening. In FIG. 1a, the load 13 is shown with a broken line.

By placing the stiffener plate between two plastic sheets, it is possible to exploit previous know-how. In practice, the plastic slides over the bottom of the load space, conforming to the shapes of the bottom, and permitting unevennesses, without catching on them. Correspondingly, when being pulled out from under the load, the friction is low and even, without lubrication. Thus the plastic sheet acts in all conditions without auxiliary agents. Generally, both plastic sheets are of the same material, but in the embodiment shown are of slightly different thicknesses. In principle, the properties of the transfer plate can be adapted to a specific application by selecting a plastic material with different properties against the load. Against a metal container is a specific plastic and against wooden battens under a load is a different plastic. In general, the thickness of the stiffener plate 14 is 5-20 mm, preferably 10-15 mm. Correspondingly, the thickness of the plastic sheets 12 and 15 is 5-20 mm, preferably 10-15 mm.

In one example of dimensioning, a 15-mm plastic sheet is used underneath and a 10-mm second plastic sheet, between which a 15-mm stiffener plate is fitted. The total thickness of the transfer plate then becomes 40 mm. The stiffener plate 14 is preferably a metal plate, which is of high-strength steel. Such a metal plate will withstand load forming and pushing and pulling without deforming. The stiffener plate can also have a composite construction, the properties of which can be adapted to each case. The plastic sheets can also have partially a composite construction, when the stiffener plate itself can form the transfer equipment. In other words, the stiffener plate and plastic sheets are joined to each other to form composite-construction transfer equipment.

In loading, it will be sufficient to fit the stiffener plate over part of the distance of the transfer equipment. Generally, the stiffener plate 14 and the second plastic sheet 15 are equally long and extend over part 23 of the length of the plastic sheet 12. The sheets are essentially of the same width. In the embodiment of FIGS. 1a-1c, the stiffener plate 14 extends for about two thirds of the length 24 of the plastic sheet 12. Generally, the partial distance 23 is more than half of the length 24 of the plastic sheet 12. By extending the stiffener plate over essentially the whole length of the transfer equipment, it is possible to also utilize the transfer equipment for unloading a load (FIGS. 2a-2c). The same reference numbers are used for parts that are functionally the similar.

In FIG. 3a, the load 13 has been pushed into the load space using the transfer equipment. Here the transfer equipment is still beneath the load in the load space. This is thus a question of loading. The load transfer device includes a gate 26, in which there is a moveable buffer 27. In FIG. 3a, the buffer 27 is in the lower position and has been pushed against the load. Thus the buffer supports the load and holds the load in place when the transfer equipment is pulled from under the load while the load remains in the load space. The load space can be the load space of a vehicle or, for example, an intermodal container. In FIG. 3b, transfer equipment according to the invention is applied with the load transfer appliance. In the invention, the load transfer appliance 11 includes means 17 for pulling the load 13 from the load space 16 onto the transfer equipment 10. Generally, the means 17 include winch means 25 and a towing belt 19, which is arranged around the load 13. Here the means 17 are two winches 18, which are hydraulic (FIGS. 3b, 4a, and 4b). Hydraulics are already in place, because the load transfer appliance too is hydraulic. Unloading is taken into account already in the loading stage, when a towing belt 19 is placed around the load formed on the transfer equipment. In the towing belt there is a widening 20, which is placed against the front part of the load, for example, a wooden batten or a pallet. The remainder of the towing belt is placed on both sides of the load and the load is moved by the load transfer appliance into the load space and the transfer equipment is pulled out from under the load, while the towing belt remains with the load in the load space. In FIG. 3b, the buffer 27 is above the load space 16, so that the load can be pulled on top of the transfer equipment 10.

At the unloading site, there is preferably also a corresponding load transfer appliance, against which the load space is set. The transfer equipment is pushed close to the load and, when unloading the load 13, an auxiliary plate 21, which ensures that the load 12 will rise on top of the transfer equipment 10 (FIG. 4a), is placed on top of the front part of the transfer equipment. The auxiliary plate 21 is shown by a dot-and-dash line in FIGS. 2a and 4a. The second plastic sheet is slightly shorter than the plastic sheet, so that a ramp is formed when loading the load space. By means of the auxiliary plate, the rising of the load on top of the second plastic sheet is ensured, without crumpling the plastic sheet. The towing belt 19 is attached to the winches 18, by which the load 13 is pulled from the load space 16 onto the transfer equipment 10. Unloading then takes place as quickly as loading. In practice, the time taken is a few minutes. In FIG. 4b, the load 13 has already been pulled half onto the transfer equipment.

The invention claimed is:

1. Transfer equipment, which is intended to be used in a load transfer appliance, and which includes a plastic sheet to be placed under a load, and which plastic sheet withstands both sliding over the bottom of a load space and pulling out from under the load characterized in that in addition to the plastic sheet, the transfer equipment includes a metal stiffener plate, which is attached as a stiffener to the plastic sheet, and the transfer equipment includes a second plastic sheet, and in the transfer equipment, the stiffener plate is arranged between the plastic sheets, and the stiffener plate and plastic sheets are attached to each other in the area of only one end to form composite construction transfer equipment.

2. Transfer equipment according to claim 1, characterized in that the thickness of the stiffener plate is 5-20 mm.

3. Transfer equipment according to claim 1, characterized in that the stiffener plate is a composite structure.

4. Transfer equipment according to claim 1, characterized in that the metal stiffener plate is of high-strength steel.

5. Transfer equipment according to claim 1, characterized in that the thickness of the plastic sheet is 5-20 mm.

6. Transfer equipment according to claim 1, characterized in that the stiffener plate includes one or more attachment lugs for attaching the transfer equipment to the load transfer appliance.

7. Transfer equipment according to claim 6, characterized in that there are two attachment lugs.

8. Transfer equipment according to claim 1, characterized in that the stiffener plate and the second plastic sheet are equally long and they extend over the whole distance of the plastic sheet.

9. Transfer equipment according to claim 1, characterized in that the stiffener plate and the second plastic sheet are equally long and they extend over part of the distance of the plastic sheet.

10. Transfer equipment according to claim 9, characterized in that the over part of the distance is more than half of the length of the plastic sheet.

11. Transfer equipment according to claim 1, characterized in that the length of the transfer equipment is 6000-16000 mm.

12. Load transfer appliance, in which transfer equipment is arranged, which includes a plastic sheet to be placed under the load, characterized in that the transfer equipment is transfer equipment according to claim 1.

13. Load transfer appliance according to claim 12, characterized in that the load transfer appliance includes means for pulling the load from the load space onto the transfer equipment.

14. Load transfer appliance according to claim 13, characterized in that the means include winch means and a towing belt, which is arranged around the load.

15. Load transfer appliance according to claim 14, characterized in that the winch means include two winches, which are hydraulic.

16. Load transfer appliance according to claim 12, characterized in that during unloading the load, the transfer equipment includes an auxiliary plate on top of the front edge of the transfer equipment.

* * * * *